(12) United States Patent
Sakaida et al.

(10) Patent No.: US 11,515,565 B2
(45) Date of Patent: Nov. 29, 2022

(54) BATTERY

(71) Applicant: Panasonic Intellectual Property Management Co., Ltd., Osaka (JP)

(72) Inventors: Masashi Sakaida, Hyogo (JP); Tetsuya Asano, Nara (JP); Akinobu Miyazaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 237 days.

(21) Appl. No.: 16/914,330

(22) Filed: Jun. 27, 2020

(65) Prior Publication Data

US 2020/0328465 A1   Oct. 15, 2020

Related U.S. Application Data

(63) Continuation of application No. PCT/JP2018/041900, filed on Nov. 13, 2018.

(30) Foreign Application Priority Data

Jan. 5, 2018   (JP) .............................. JP2018-000432

(51) Int. Cl.
  *H01M 10/0562*   (2010.01)
  *H01M 10/0525*   (2010.01)
  (Continued)

(52) U.S. Cl.
  CPC ......... *H01M 10/0562* (2013.01); *C01B 25/14* (2013.01); *C01F 17/36* (2020.01);
  (Continued)

(58) Field of Classification Search
  None
  See application file for complete search history.

(56) References Cited

U.S. PATENT DOCUMENTS

| 4,352,869 A | 10/1982 | Mellors |
| 5,506,073 A | 4/1996 | Angell et al. |

(Continued)

FOREIGN PATENT DOCUMENTS

| CN | 105254184 | 1/2016 |
| CN | 105680048 A | 6/2016 |

(Continued)

OTHER PUBLICATIONS

International Search Report of PCT application No. PCT/JP2018/041900 dated Feb. 19, 2019.

(Continued)

*Primary Examiner* — Gregg Cantelmo
(74) *Attorney, Agent, or Firm* — McDermott Will & Emery LLP

(57) ABSTRACT

Provided is a battery comprising a cathode, an anode, and an electrolyte layer. The electrolyte layer includes a first electrolyte layer and a second electrolyte layer. The first electrolyte layer includes a first solid electrolyte material. The second electrolyte layer includes a second solid electrolyte material which is a material different from the first solid electrolyte material. The first solid electrolyte material includes lithium, at least one kind selected from the group consisting of metalloid elements and metal elements other than lithium, and at least one kind selected from the group consisting of chlorine, bromine, and iodine. The first solid electrolyte material does not include sulfur.

20 Claims, 3 Drawing Sheets

(51) Int. Cl.
  *C01F 17/36* (2020.01)
  *C01B 25/14* (2006.01)
  *C01G 49/00* (2006.01)
(52) U.S. Cl.
  CPC ...... *C01G 49/009* (2013.01); *H01M 10/0525* (2013.01); *C01P 2006/40* (2013.01); *H01M 2300/008* (2013.01); *H01M 2300/0094* (2013.01)

(56) References Cited

U.S. PATENT DOCUMENTS

| | | | |
|---|---|---|---|
| 5,714,279 | A | 2/1998 | Zajac, Jr. et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1* | 5/2015 | Kato ............... H01M 10/0562 29/623.5 |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359193 | A1 | 12/2016 | Yi et al. |
| 2017/0040637 | A1 | 2/2017 | Ceder et al. |
| 2017/0179481 | A1 | 6/2017 | Kamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0288281 | A1 | 10/2017 | Chiang et al. |
| 2018/0183065 | A1* | 6/2018 | Sasaki ............... H01M 50/409 |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350615 | A1 | 11/2020 | Sakaida et al. |
| 2020/0350622 | A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 A | 8/2004 |
| JP | 2006-244734 | 9/2006 |
| JP | 2008-021556 A | 1/2008 |
| JP | 2011-129312 | 6/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-117753 A | 6/2017 |
| JP | 2017-518622 A | 7/2017 |
| JP | 2017-152324 | 8/2017 |
| JP | 6222134 B2 | 11/2017 |
| JP | 2017-224474 A | 12/2017 |
| WO | 2011/073798 A2 | 6/2011 |
| WO | 2015/011937 A1 | 1/2015 |
| WO | 2015/030052 | 3/2015 |
| WO | 2015/049986 A1 | 4/2015 |
| WO | 2017/108105 A1 | 6/2017 |
| WO | 2017/154766 A1 | 9/2017 |
| WO | 2017/154922 A1 | 9/2017 |
| WO | 2018/025582 | 2/2018 |
| WO | 2018/025582 A1 | 2/2018 |
| WO | 2019/146218 A1 | 8/2019 |
| WO | 2019/146219 A1 | 8/2019 |

OTHER PUBLICATIONS

Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc) Synthesis, Crystal Structures, and Ionic Motion", Journal of Inorganic and General Chemistry, Jul. 1997, vol. 623/Issue 7, pp. 1067-1073.
Indian Examination Report dated Mar. 28, 2022 for the related Indian Patent Application No. 202047027797.
Indian Examination Report dated Apr. 4, 2022 for the related Indian Patent Application No. 202047027476.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/046264 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.

(56) References Cited

OTHER PUBLICATIONS

Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz, H.D. et al., "Ionic motion of tetrahedrally and octahedrally coordinated lithium ions in ternary and quaternary halides", Solid State Ionics, North Holland Pub. Company. Amsterdam; NL, vol. 28-30, Sep. 1, 1988, pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (MI=Li, Na, Ag; MIII=In, Y)." Zeitschrift fur anorganische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.

* cited by examiner

BATTERY

BACKGROUND

1. Technical Field

The present disclosure relates to a battery.

2. Description of the Related Art

Patent Literature 1 discloses an all-solid battery using a sulfide solid electrolyte.

Patent Literature 2 discloses an all-solid battery using a halide including indium as a solid electrolyte.

CITATION LIST

Patent Literature

Patent Literature 1: Japanese Patent Application Publication No. 2011-129312
Patent Literature 2: Japanese Patent Application Publication No. 2006-244734

SUMMARY

In the prior art, suppression of occurrence of short circuit is desired.

The battery according to one aspect of the present disclosure comprises:
  a cathode;
  an anode; and
  an electrolyte layer disposed between the cathode and the anode,
  wherein
  the electrolyte layer includes a first electrolyte layer and a second electrolyte layer;
  the first electrolyte layer includes a first solid electrolyte material;
  the second electrolyte layer includes a second solid electrolyte material which is a material different from the first solid electrolyte material;
  the first solid electrolyte material includes:
  lithium;
  at least one selected from the group consisting of metalloid elements and metal elements other than lithium; and
  at least one kind selected from the group consisting of chlorine, bromine, and iodine; and
  the first solid electrolyte material does not include sulfur.

According to the present disclosure, the occurrence of the short circuit can be suppressed.

DETAILED DESCRIPTION OF THE EMBODIMENTS

Hereinafter, an embodiment of the present disclosure will be described with reference to the drawings.

First Embodiment

Figure 1:
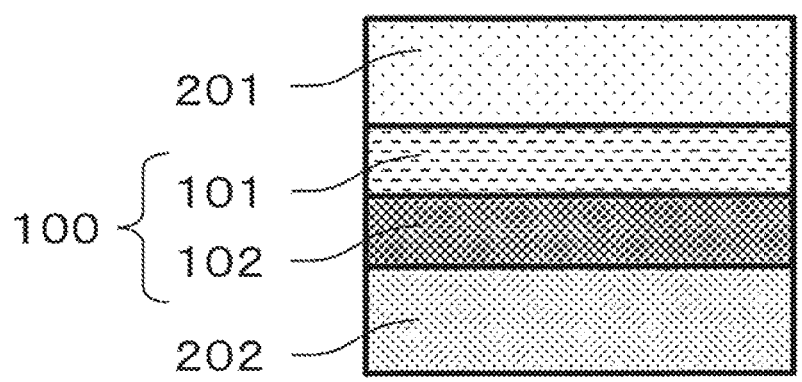
FIG. 1 is a cross-sectional view showing a schematic configuration of a battery 1000 in a first embodiment.

FIG. 1 is a cross-sectional view showing a schematic configuration of a battery 1000 in the first embodiment.

The battery 1000 in the first embodiment comprises a cathode 201, an anode 202, and an electrolyte layer 100.

The electrolyte layer 100 is a layer provided between the cathode 201 and the anode 202.

The electrolyte layer 100 includes a first electrolyte layer 101 and a second electrolyte layer 102.

The first electrolyte layer 101 includes a first solid electrolyte material.

The second electrolyte layer 102 includes a second solid electrolyte material. The second solid electrolyte material is a material different from the first solid electrolyte material.

The first solid electrolyte material is a material represented by the following composition formula (1):

$$Li_\alpha M_\beta X_\gamma \qquad \text{Formula (1)}$$

where, $\alpha$, $\beta$ and $\gamma$ are values larger than 0.

M includes at least one of metalloid elements and metal elements other than Li.

X is one or more kinds of elements selected from the group consisting of Cl, Br and I.

According to the above configuration, occurrence of short circuit can be suppressed. In other words, it is possible to decrease risk of the short circuit due to precipitation of a lithium metal at the time of overcharging. This can improve safety. This is probably because, when a ternary or higher halide electrolyte is brought into contact with a lithium metal, the lithium metal is consumed by partially reducing the ternary or higher halide electrolyte, and further growth of the lithium metal is suppressed.

The term "metalloid elements" are B, Si, Ge, As, Sb, and Te.

The term "metal element" refers to all elements included in Groups 1 to 12 of the periodic table except for hydrogen, and all elements included in Groups 13 to 16 of the periodic table except for all the metalloid elements, C, N, P, O, S, and Se. In other words, the metal element becomes a cation, if the metal element forms an inorganic compound with a halide.

In the composition formula (1), M may include Y (=yttrium).

In other words, the first solid electrolyte material may include Y as a metal element.

According to the above configuration, ion conductivity of the first solid electrolyte material can be further improved. Thereby, the charge/discharge efficiency of the battery can be further improved.

The first solid electrolyte material including Y may be, for example, a compound represented by the composition formula $Li_a Me_b Y_c X_6$ (a+mb+3c=6 and c>0 are satisfied) (Me: at least one of metalloid elements and metal elements other than Li and Y) (m: valence number of Me).

As Me, any of Mg, Ca, Sr, Ba, Zn, Sc, Al, Ga, Bi, Zr, Hf, Ti, Sn, Ta, Nb, or a mixture thereof may be used.

According to the above configuration, the ion conductivity of the first solid electrolyte material can be further improved.

In the composition formula (1), M may include Fe.

According to the above configuration, the ion conductivity of the first solid electrolyte material can be further improved. Thereby, the charge/discharge efficiency of the battery can be further improved.

The first solid electrolyte material may be $Li_3YI_6$, $Li_3YCl_6$, $Li_{3.1}Y_{0.9}Ca_{0.1}Br_6$, or $Li_2FeCl_4$.

According to the above configuration, the ion conductivity of the first solid electrolyte material can be further improved. Thereby, the charge/discharge efficiency of the battery can be further improved.

The first solid electrolyte material may be a material represented by the following composition formula (A1):

$$Li_{6-3d}Y_dX_6 \quad \text{Formula (A1)}$$

where, in the composition formula (A1), X is two or more kinds of elements selected from the group consisting of Cl, Br, and I.

In addition, in the composition formula (A1), $0<d<2$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A2):

$$Li_3YX_6 \quad \text{Formula (A2)}$$

where, in the composition formula (A2), X is two or more kinds of elements selected from the group consisting of Cl, Br, and I.

According to the above configuration, the ion conductivity of the first solid electrolyte material can be further improved. Thereby, the charge/discharge efficiency of the battery can be further improved.

The first solid electrolyte material may be a material represented by the following composition formula (A3):

$$Li_{3-3\delta}Y_{1+\delta}Cl_6 \quad \text{Formula (A3)}$$

where, in the composition formula (A3), $0<\delta\leq0.15$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A4):

$$Li_{3-3\delta}Y_{1+\delta}Br_6 \quad \text{Formula (A4)}$$

where, in the composition formula (A4), $0<\delta\leq0.25$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A5):

$$Li_{3-3\delta+a}Y_{1+\delta-a}Me_aCl_{6-x-y}Br_xI_y \quad \text{Formula (A5)}$$

where, in the composition formula (A5), Me is one or more kinds of elements selected from the group consisting of Mg, Ca, Sr, Ba and Zn.

In addition, in the composition formula (A5),
$-1<\delta<2$;
$0<a<3$;
$0<(3-3\delta+a)$;
$0\leq(1+\delta-a)$;
$0\leq x\leq 6$;
$0\leq y\leq 6$; and
$(x+y)\leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A6):

$$Li_{3-3\delta}Y_{1+\delta-a}Me_aCl_{6-x-y}Br_xI_y \quad \text{Formula (A6)}$$

where, in the composition formula (A6), Me is one or more kinds of elements selected from the group consisting of Al, Sc, Ga and Bi.

In addition, in the composition formula (A6),
$-1<\delta<1$;
$0<a<2$;
$0<(1+\delta-a)$;
$0\leq x\leq 6$;
$0\leq y\leq 6$; and
$(x+y)\leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A7):

$$Li_{3-3\delta-a}Y_{1+\delta-a}Me_aCl_{6-x-y}Br_xI_y \quad \text{Formula (A7)}$$

where, in the composition formula (A7), Me is one or more kinds of elements selected from the group consisting of Zr, Hf, and Ti.

In addition, in the composition formula (A7),
$-1<\delta<1$;
$0<a<1.5$;
$0<(3-3\delta-a)$;
$0<(1+\delta-a)$;
$0\leq x\leq 6$;
$0\leq y\leq 6$; and
$(x+y)\leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A8):

$$Li_{3-3\delta-2a}Y_{1+\delta-a}Me_aCl_{6-x-y}Br_xI_y \quad \text{Formula (A8)}$$

where, in the composition formula (A8), Me is one or more kinds of elements selected from the group consisting of Ta and Nb.

In addition, in the composition formula (A8),
$-1<\delta<1$;
$0<a<1.2$;
$0<(3-3\delta-2a)$;
$0<(1+\delta-a)$;
$0\leq x\leq 6$;
$0\leq y\leq 6$; and
$(x+y)\leq 6$ are satisfied.

According to the above configuration, the ion conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ may be used.

The first electrolyte layer 101 may include the first solid electrolyte material as a main component. In other words, the first electrolyte layer 101 may include the first solid electrolyte material, for example, at a weight ratio of not less than 50% (not less than 50% by weight) to the entire first electrolyte layer 101.

According to the above configuration, the charge/discharge characteristic of the battery can be further improved. Furthermore, the occurrence of the short circuit can be further suppressed.

The first electrolyte layer 101 may include the first solid electrolyte material, for example, at a weight ratio of not less than 70% (not less than 70% by weight) to the entire first electrolyte layer 101.

According to the above configuration, the charge/discharge characteristic of the battery can be further improved. Furthermore, the occurrence of the short circuit can be further suppressed.

The first electrolyte layer 101 may further include inevitable impurities. The first electrolyte layer may include the starting materials used for the synthesis of the first solid electrolyte material. The first electrolyte layer may include by-products or decomposition products generated when the first solid electrolyte material is synthesized.

In addition, the first electrolyte layer 101 may include the first solid electrolyte material, for example, at a weight ratio of 100% (100% by weight) to the entire first electrolyte layer 101, except for the inevitable impurities.

According to the above configuration, the charge/discharge characteristic of the battery can be further improved. Furthermore, the occurrence of the short circuit can be further suppressed.

The first electrolyte layer 101 may be composed only of the first solid electrolyte material.

As the second solid electrolyte material, for example, a sulfide solid electrolyte, an oxide solid electrolyte, or an organic polymer solid electrolyte may be used.

As the sulfide solid electrolyte, $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$ may be used.

In other words, the second solid electrolyte material may be a sulfide solid electrolyte. In this case, the sulfide solid electrolyte may include lithium sulfide and phosphorus sulfide. For example, the sulfide solid electrolyte may be $Li_2S-P_2S_5$.

According to the above configuration, the ion conductivity between the cathode 201 and the anode 202 can be further improved.

As the oxide solid electrolyte, a NASICON solid electrolyte such as $LiTi_2(PO_4)_3$ and its element substitution products, a $(LaLi)TiO_3$ perovskite solid electrolyte, a LISICON solid electrolyte such as $Li_{14}ZnGe_4O_{16}$, $Li_4SiO_4$, $LiGeO_4$ and its element substitution products, a garnet solid electrolyte such as $Li_7La_3Zr_2O_{12}$ and its element substitution products, $Li_3N$ and its H substitution products, and $Li_3PO_4$ and its N substitution products may be used.

As the organic polymer solid electrolyte, for example, a compound of a polymer compound and a lithium salt can be used. The polymer compound may have an ethylene oxide structure. Due to the ethylene oxide structure, a large amount of lithium salt can be included to further increase the ion conductivity. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one lithium salt selected from these may be used alone. Alternatively, a mixture of two or more kinds of the lithium salts selected from these may be used as the lithium salt.

The second electrolyte layer 102 may include the second solid electrolyte material as a main component. In other words, the second electrolyte layer 102 may include the second solid electrolyte material, for example, at weight ratio of not less than 50% (not less than 50% by weight) to the entire second electrolyte layer 102.

According to the above configuration, the charge/discharge characteristic of the battery can be further improved.

The second electrolyte layer 102 may include the second solid electrolyte material, for example, at weight ratio of not less than 70% (not less than 70% by weight) to the entire second electrolyte layer 102.

According to the above configuration, the charge/discharge characteristic of the battery can be further improved.

The second electrolyte layer 102 may further include inevitable impurities. The second electrolyte layer may include the starting materials used for the synthesis of the second solid electrolyte material. The second electrolyte layer may include by-products or decomposition products generated when the second solid electrolyte material is synthesized.

In addition, the second electrolyte layer 102 may include the second solid electrolyte material, for example, at a weight ratio of 100% (100% by weight) to the entire second electrolyte layer 102, except for the inevitable impurities.

According to the above configuration, the charge/discharge characteristic of the battery can be further improved.

The second electrolyte layer 102 may be composed only of the second solid electrolyte material.

The first electrolyte layer 101 and the second electrolyte layer 102 may include two or more kinds of the materials described as the solid electrolyte material. The same material may be included in the first electrolyte layer 101 and the second electrolyte layer 102. Different materials may be used, depending on a property of each layer.

The thickness of the electrolyte layer 100 may be not less than 1 μm and not more than 100 μm. If the thickness of the electrolyte layer 100 is less than 1 μm, the possibility of the short circuit between the cathode 201 and the anode 202 is increased. In addition, if the thickness of the electrolyte layer 100 is more than 100 μm, the operation at high output may be difficult.

The cathode 201 includes a material having a property of storing and releasing metal ions (for example, lithium ions). The cathode 201 includes, for example, a cathode active material (for example, cathode active material particles 211).

Examples of the cathode active material include lithium-containing transition metal oxides (e.g., $Li(NiCoAl)O_2$ or $LiCoO_2$), transition metal fluorides, polyanions, fluorinated polyanion materials, transition metal sulfides, transition metal oxyfluorides, transition metal oxysulfides, and transition metal oxynitrides.

The cathode active material may be lithium cobaltate. For example, the cathode active material may be $LiCoO_2$. Thereby, the charge/discharge efficiency of the battery can be further improved.

The thickness of the cathode 201 may be not less than 10 μm and not more than 500 μm. If the thickness of the cathode is less than 10 μm, it may be difficult to secure an energy density of the battery sufficiently. If the thickness of the cathode is more than 500 μm, the operation at high output may be difficult.

The anode 202 includes a material having a property of storing and releasing metal ions (e.g., lithium ions). The anode 202 includes, for example, an anode active material.

For the anode active material, a metal material, a carbon material, an oxide, a nitride, a tin compound, or a silicon compound may be used. The metal material may be a single metal. Alternatively, the metal material may be an alloy. Examples of the metal material include a lithium metal and a lithium alloy. Examples of the carbon material include natural graphite, coke, graphitized carbon, carbon fibers, spherical carbon, artificial graphite, and amorphous carbon. From the viewpoint of capacity density, silicon (Si), tin (Sn), a silicon compound, or a tin compound can be suitably used.

The thickness of the anode 202 may be not less than 10 µm and not more than 500 µm. If the thickness of the anode is less than 10 µm, it may be difficult to secure an energy density of the battery sufficiently. In addition, if the thickness of the anode is more than 500 µm, the operation at high output may be difficult.

The cathode 201 may include the above-mentioned sulfide solid electrolyte, the above-mentioned oxide solid electrolyte, or the above-mentioned organic polymer solid electrolyte for the purpose of enhancing the ion conductivity.

At least one of the cathode 201 and the electrolyte layer 100 may include a non-aqueous electrolyte solution, a gel electrolyte, or an ionic liquid for the purpose of facilitating exchange of lithium ions and improving the output characteristic of the battery.

The non-aqueous electrolyte solution includes a non-aqueous solvent and a lithium salt which has been dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent may be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these may be used alone. Alternatively, a combination of two or more kinds of the non-aqueous solvents selected from these may be used as the non-aqueous solvent. The non-aqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one lithium salt selected from these may be used alone. Alternatively, a mixture of two or more kinds of lithium salts selected from these may be used as the lithium salt. The concentration of the lithium salt is, for example, within a range of 0.5 to 2 mol/liter.

As the gel electrolyte, a polymer material including the non-aqueous electrolyte solution may be used. As the polymer material, polyethylene oxide, polyacrylonitrile, polyvinylidene fluoride, polymethyl methacrylate, or a polymer having an ethylene oxide bond may be used.

The cation forming the ionic liquid may be:

an aliphatic chain quaternary salt such as tetraalkylammonium or tetraalkylphosphonium, aliphatic cyclic ammonium such as pyrrolidinium, morpholinium, imidazolinium, tetrahydropyrimidinium, piperazinium, or piperidinium; or a nitrogen-containing heterocyclic aromatic cation such as pyridinium or imidazolium.

An anion forming the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

At least one of the cathode 201, the electrolyte layer 100, and the anode 202 may include a binder for the purpose of improving the adhesion between the particles. The binder is used to improve the binding property of the material forming the electrode. Examples of the binder include polyvinylidene fluoride, polytetrafluoroethylene, polyethylene, polypropylene, aramid resin, polyimide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, and carboxymethylcellulose. As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. In addition, two or more kinds of selected from these may be mixed and used as the binder.

In addition, at least one of the cathode 201 and the anode 202 may include a conductive agent as necessary.

The conductive agent is used to reduce electrode resistance. Examples of the conductive agent include graphite such as natural graphite or artificial graphite; carbon black such as acetylene black or ketjen black; a conductive fiber such as a carbon fiber or a metal fiber; carbon fluoride; metal powder such as aluminum; conductive whiskers such as zinc oxide or potassium titanate; a conductive metal oxide such as titanium oxide; and a conductive polymer compound such as polyaniline, polypyrrole, or polythiophene. Cost reduction can be achieved by using carbon conductive agent as the conductive agent.

As shown in FIG. 1, the first electrolyte layer 101 may be provided between the cathode 201 and the second electrolyte layer 102.

According to the above configuration, the ion conductivity between the cathode 201 and the anode 202 can be further improved. Furthermore, the occurrence of the short circuit can be further suppressed.

As shown in FIG. 1, the first electrolyte layer 101 may be positioned without being in contact with the anode 202.

According to the above configuration, the ion conductivity between the cathode 201 and the anode 202 can be further improved. Furthermore, the occurrence of the short circuit can be further suppressed.

The cathode 201 may include the first solid electrolyte material.

According to the above configuration, the ion conductivity between the cathode 201 and the anode 202 can be further improved.

Figure 2:
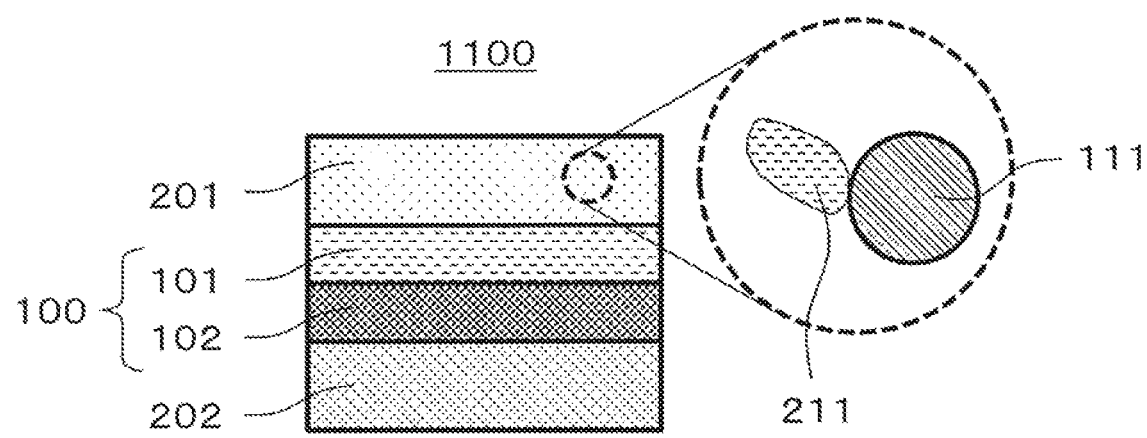
FIG. 2 is a cross-sectional view showing a schematic configuration of a battery 1100 in the first embodiment.

FIG. 2 is a cross-sectional view showing a schematic configuration of a battery 1100 in the first embodiment.

In the battery 1100 according to the first embodiment, the cathode 201 includes a material mixture of first solid electrolyte particles 111 and cathode active material particles 211.

Each of the first solid electrolyte particles 111 may be a particle composed of the first solid electrolyte material or a particle including the first solid electrolyte material as a main component at a weight ratio of, for example, not less than 50% (not less than 50% by weight) to the entire of the first solid electrolyte particle 111.

In addition, a shape of each of the first solid electrolyte particles 111 in the first embodiment is not particularly limited, and may be, for example, an acicular shape, a spherical shape, or an elliptical spherical shape. For example, the shape of each of the first solid electrolyte particles 111 may be a particle.

For example, if the shape of the first solid electrolyte particle 111 in the first embodiment is particulate (e.g., spherical), the median diameter thereof may be not more than 100 µm. If the median diameter is more than 100 µm, there is a possibility that a good dispersion state of the cathode active material particles 211 and the first solid electrolyte particles 111 fails to be formed in the cathode material. Therefore, the charge/discharge characteristic is lowered. In the first embodiment, the median diameter may be not more than 10 µm.

According to the above configuration, a good dispersion state of the cathode active material particles 211 and the first solid electrolyte particles 111 can be formed in the cathode 201.

In addition, in the first embodiment, the first solid electrolyte particles 111 may be smaller than the median diameter of the cathode active material particles 211.

According to the above configuration, a better dispersion state of the first solid electrolyte particles 111 and the cathode active material particles 211 can be formed in the electrode.

The median diameter of the cathode active material particles 211 may be not less than 0.1 µm and not more than 100 µm.

If the median diameter of the cathode active material particles 211 is less than 0.1 µm, there is a possibility that a good dispersion state of the cathode active material particles 211 and the first solid electrolyte particles 111 fails to be formed in the cathode. As a result, the charge/discharge characteristic of the battery is lowered. In addition, if the median diameter of the cathode active material particles 211 is more than 100 µm, lithium diffusion in the cathode active material particles 211 is made slow. As a result, the operation at high output of the battery may be difficult.

The median diameter of the cathode active material particles 211 may be larger than the median diameter of the first solid electrolyte particles 111. Thereby, a good dispersion state of the cathode active material particles 211 and the first solid electrolyte particles 111 can be formed.

In addition, the cathode 201 may include a plurality of the first solid electrolyte particles 111 and a plurality of the cathode active material particles 211.

The content of the first solid electrolyte particles 111 and the content of the cathode active material particles 211 in the cathode 201 may be the same as or different from each other.

With regard to a volume ratio "v: 100−v" of the cathode active material and the first solid electrolyte material included in the cathode 201, $30 \leq v \leq 95$ may be satisfied. If v<30, it may be difficult to secure an energy density of the battery sufficiently. In addition, if v>95, the operation at high output may be difficult.

Figure 3:
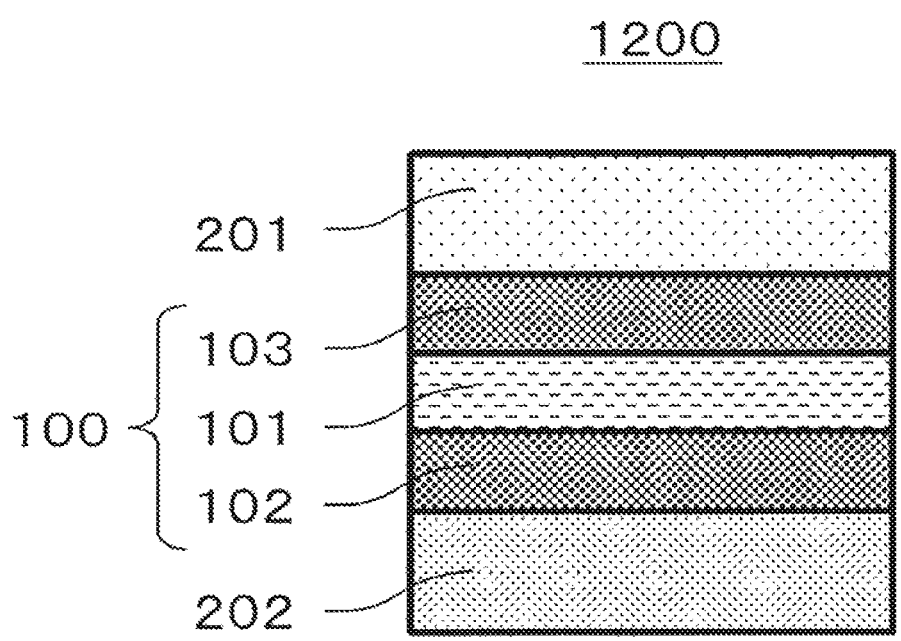
FIG. 3 is a cross-sectional view showing a schematic configuration of a battery 1200 in the first embodiment.

FIG. 3 is a cross-sectional view showing a schematic configuration of a battery 1200 in the first embodiment.

In the battery 1200 in the first embodiment, the electrolyte layer 100 includes a third electrolyte layer 103.

The third electrolyte layer 103 is provided between the cathode 201 and the first electrolyte layer 101.

The cathode 201 and the third electrolyte layer 103 include a sulfide solid electrolyte.

According to the above configuration, the ion conductivity between the cathode 201 and the anode 202 can be further improved.

An example of the shape of the battery in the first embodiment is a coin, a cylinder, a prism, a sheet, a button, a flat type, or a stacking structure.

<Manufacturing Method of First Solid Electrolyte Material>

The first solid electrolyte material in the first embodiment can be produced, for example, by the following method.

Binary halide raw material powders are prepared so as to provide a blending ratio of a target composition. For example, if $Li_3YCl_6$ is produced, $LiCl$ and $YCl_3$ are prepared at a molar ratio of 3:1.

At this time, "M", "Me", and "X" in the above-described composition formula can be determined by selecting the kinds of the raw material powders. In addition, the above-mentioned values "α", "β", "γ", "d", "δ", "a", "x" and "y" can be adjusted by adjusting the raw materials, the blending ratio and the synthesis process.

The raw material powders are mixed well, and then, the raw material powders are mixed and ground to react by a mechanochemical milling method. Alternatively, the raw material powders may be mixed well, and then sintered in a vacuum.

Thereby, a solid electrolyte material including a crystal phase as described above is provided.

The configuration of the crystal phase (the crystal structure) in the solid electrolyte material can be determined by adjusting the reaction method and reaction conditions of the raw material powders.

EXAMPLES

Hereinafter, details of the present disclosure will be described with reference to the inventive examples and the comparative example.

Inventive Example 1

[Production of First Solid Electrolyte Material]

In a dry atmosphere with a dew point of −30° C. or less, raw material powders LiI and $YI_3$ were prepared at a molar ratio of LiI:$YI_3$=3:1. These were ground and mixed in a mortar. Subsequently, milling processing was performed at 600 rpm for 25 hours using a planetary ball mill.

Thereby, a powder of the first solid electrolyte material $Li_3YI_6$ which was a halide solid electrolyte including a crystal phase was provided.

[Production of Second Solid Electrolyte Material]

In an argon glove box having an Ar atmosphere with a dew point of −60° C. or less, $Li_2S$ and $P_2S_5$ were prepared at a molar ratio of $Li_2S:P_2S_5$=75:25. These were ground and mixed in a mortar. Subsequently, milling processing was performed at 510 rpm for 10 hours using a planetary ball mill to provide a glassy solid electrolyte. The glassy solid electrolyte was heat-treated at 270° C. for 2 hours in an inert atmosphere.

In this way, the second solid electrolyte material Li$_2$S—P$_2$S$_6$ (hereinafter, referred to as LPS), which was a glass-ceramic sulfide solid electrolyte, was provided.

[Production of Secondary Battery]

In the argon glove box, the first solid electrolyte material Li$_3$YI$_6$ produced by the above method and LiCoO$_2$ (hereinafter, referred to as LCO), which was a cathode active material, were prepared at a volume ratio of 50:50. By mixing these in an agate mortar, a cathode mixture of the inventive example 1 was produced.

In the insulating outer cylinder, the LPS which had been prepared by the above method and corresponded to 200 μm thickness, the first solid electrolyte material Li$_3$YI$_6$ which had been prepared by the above method and corresponded to 200 μm thickness, and 15.4 mg of the cathode mixture were stacked in this order. This was pressure-molded at a pressure of 360 MPa to provide a cathode and a solid electrolyte layer.

Next, a metallic lithium (300 μm in thickness) was stacked on a surface of the LPS opposite to a surface which was in contact with the cathode of the solid electrolyte layer. This was pressure-molded at a pressure of 80 MPa to provide a stacking structure composed of the cathode, the solid electrolyte layer and an anode.

Next, stainless steel current collectors were disposed on the upper and lower parts of the stacking structure, and current collection leads were attached to the current collectors.

Finally, an insulating ferrule was used to block and seal the inside of the insulating outer cylinder from the outside atmosphere to produce a battery.

[Charge/Discharge Test]

The battery was placed in a thermostatic chamber at 25° C.

The battery was charged at a constant current at a current value of 0.05 C rate (20 hours rate) with respect to theoretical capacity of the battery, and the charge was terminated at a voltage of 4.2 V.

Next, the battery was discharged at a current value of 0.05 C rate, and the discharge was terminated at a voltage of 2.5 V.

No short circuit occurred and the initial charge capacity was 0.23 mAh.

Inventive Example 2

LiBr, YBr$_3$ and CaBr$_2$ were used as raw material powders of the first solid electrolyte material, and mixed at a molar ratio of LiBr:YBr$_3$:CaBr$_2$=3.1:0.9:0.1. Except for this, a first solid electrolyte material Li$_{3.1}$Y$_{0.9}$Ca$_{0.1}$Br$_6$ was provided in the same manner as in the inventive example 1.

Li$_{3.1}$Y$_{0.9}$Ca$_{0.1}$Br$_6$ was used as the first solid electrolyte material in place of Li$_3$YI$_6$. Except for this, the production of a secondary battery and the charge/discharge test were performed in the same manner as in the inventive example 1.

Figure 4:
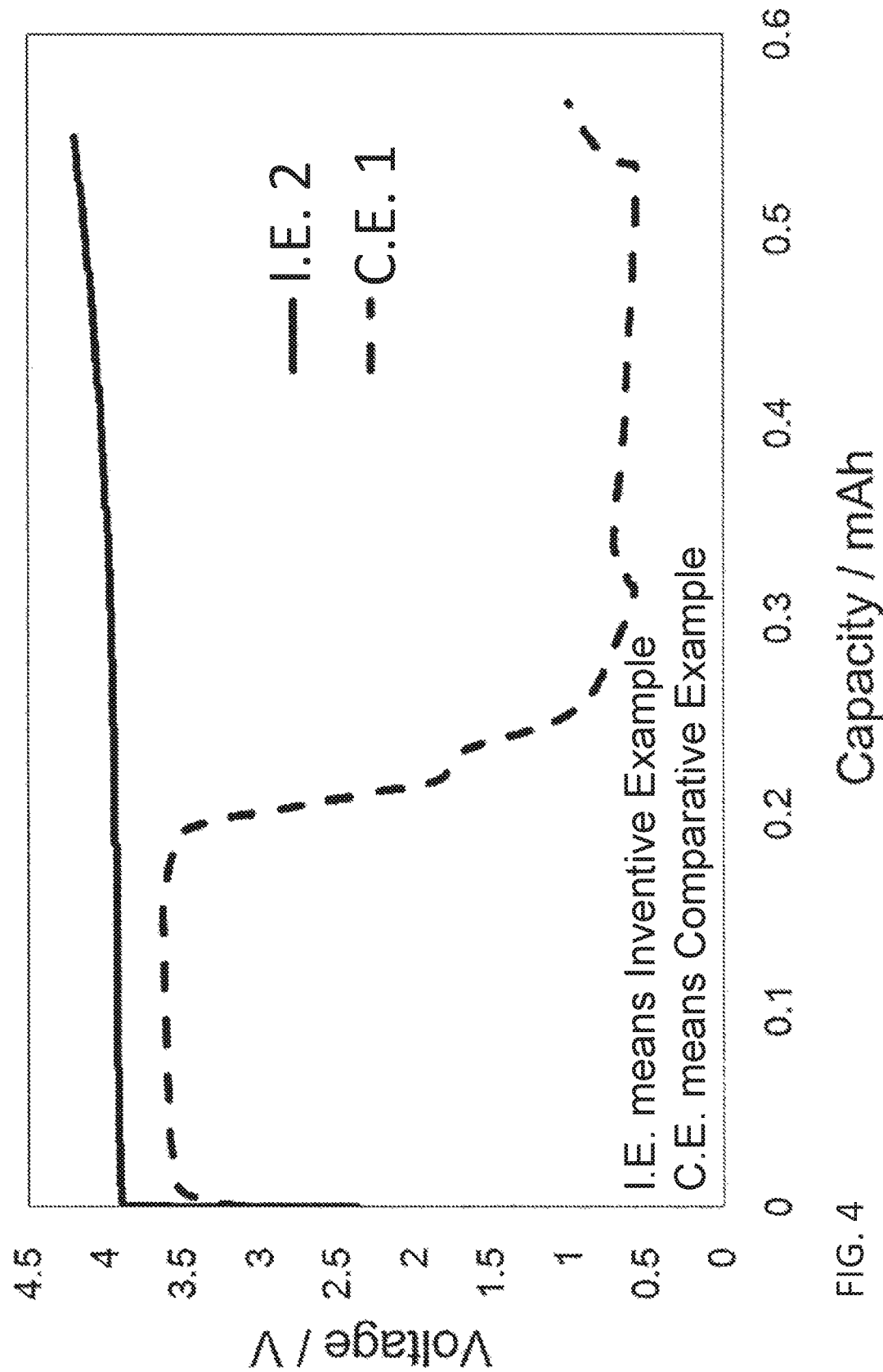
FIG. 4 is a graph showing an initial charge characteristic of the batteries in the inventive example 2 and the comparative example 1.

FIG. 4 is a graph showing the initial charge characteristic of each of the batteries in the inventive example 2 and the comparative example 1.

No short circuit occurred, and the initial charge capacity was 0.55 mAh.

Inventive Example 3

LiCl and FeCl$_2$ were used as raw material powders of the first solid electrolyte material, and mixed in a molar ratio of LiCl:FeCl$_2$=2:1. Except for this, a first solid electrolyte material of Li$_2$FeCl$_4$ was provided in the same manner as in the inventive example 1.

As the solid electrolyte in the cathode mixture, LPS was used in place of Li$_3$YI$_6$. LPS which corresponded to 100 μm thickness, Li$_2$FeCl$_4$ which had been prepared by the above method and corresponded to 200 μm thickness, LPS which corresponded to 100 μm thickness, and 14.2 mg of the cathode mixture were stacked in this order. Except for this, a secondary battery was produced in the same manner as in the inventive example 1.

The temperature of the thermostatic chamber was 85° C. Except for this, the charge/discharge test was performed in the same manner as in the inventive example 1.

No short circuit occurred, and the initial charge capacity was 1.47 mAh.

Inventive Example 4

LiCl and YCl$_3$ were used as raw material powders of the first solid electrolyte material, and mixed at a molar ratio of LiCl:YCl$_3$=3:1. Except for this, a first solid electrolyte material Li$_3$YCl$_6$ was provided in the same manner as in the inventive example 1.

Li$_3$YCl$_6$ was used as the first solid electrolyte material in place of Li$_3$YI$_6$. Except for this, the production of the secondary battery and the charge/discharge test were performed in the same manner as in the inventive example 1.

No short circuit occurred, and the initial charge capacity was 0.58 mAh.

Comparative Example 1

A sulfide solid electrolyte LPS was used as an electrolyte material. The electrolyte layer was only one layer having a thickness of 600 μm. Except for this, the production of the secondary battery and the charge/discharge test were performed in the same manner as in the inventive example 1.

The initial charge characteristic of the battery in the comparative example 1 was shown in FIG. 4. In the comparative example 1, short circuit occurred during the initial charge.

Table 1 shows the initial charge characteristic in the inventive examples 1-4 and the comparative example 1.

TABLE 1

| | Cathode | Electrolyte layer | Charge Capacity (mAh) | Presence or Absence of Short Circuit |
|---|---|---|---|---|
| Inventive Example 1 | LCO + Li$_3$YI$_6$ | Li$_3$YI$_6$/ LPS | 0.23 | Absent |
| Inventive Example 2 | LCO + Li$_3$YCl$_6$ | Li$_{3.1}$Y$_{0.9}$Ca$_{0.1}$Br$_6$/ LPS | 0.55 | Absent |
| Inventive Example 3 | LCO + LPS | LPS/Li$_2$FeCl$_4$/ LPS | 1.47 | Absent |
| Inventive Example 4 | LCO + Li$_3$YCl$_6$ | Li$_3$YCl$_6$/ LPS | 0.58 | Absent |
| Comparative Example 1 | LCO + LPS | LPS | — | Present |

As understood from the comparison of the inventive examples 1 to 4 to the comparative example 1, the charge was completed without short circuit in the batteries of the inventive examples 1 to 4, whereas short circuit occurred during the charge in the comparative example 1.

From the above, it is shown that the all-solid battery according to the present invention is a battery in which internal short circuit due lithium metal deposition is prevented, and that the all-solid battery according to the present invention is excellent in high safety.

INDUSTRIAL APPLICABILITY

The battery of the present disclosure can be used as, for example, an all solid lithium secondary battery.

REFERENTIAL SIGNS LIST

100 Electrolyte layer
101 First electrolyte layer
102 Second electrolyte layer
103 Third electrolyte layer
111 First solid electrolyte particle
201 Cathode
202 Anode
211 Cathode active material particle
1000, 1100, 1200 Battery

The invention claimed is:
1. A battery, comprising:
a cathode;
an anode; and
an electrolyte layer disposed between the cathode and the anode, wherein:
the electrolyte layer includes a first electrolyte layer and a second electrolyte layer,
the first electrolyte layer includes a first solid electrolyte material,
the second electrolyte layer includes a second solid electrolyte material which is a material different from the first solid electrolyte material,
the first solid electrolyte material includes:
lithium;
at least one selected from the group consisting of metalloid elements and metal elements other than lithium; and
at least one kind selected from the group consisting of chlorine, bromine, and iodine,
the first solid electrolyte material does not include sulfur, and
the first solid electrolyte material is represented by a composition formula $Li_\alpha M_\beta X_\gamma$,
where, all of $\alpha$, $\beta$ and $\gamma$ are greater than 0,
M is at least one kind selected from the group consisting of metalloid elements and metal elements other than Li, and
X is at least one selected from the group consisting of Cl, Br, and I.
2. The battery according to claim 1, wherein
the first solid electrolyte material includes yttrium or iron.
3. The battery according to claim 2, wherein
the first solid electrolyte material is $Li_3YI_6$, $Li_3YCl_6$, $Li_{3.1}Y_{0.9}Ca_{0.1}Br_6$, or $Li_2FeCl_4$.
4. The battery according to claim 1, wherein
the first electrolyte layer is disposed between the cathode and the second electrolyte layer.
5. The battery according to claim 4, wherein
the first electrolyte layer is not in contact with the anode.
6. The battery according to claim 1, wherein
the second solid electrolyte material is a sulfide solid electrolyte.
7. The battery according to claim 6, wherein
the sulfide solid electrolyte includes lithium sulfide and phosphorus sulfide.
8. The battery according to claim 7, wherein
the sulfide solid electrolyte is $Li_2S$—$P_2S_5$.
9. The battery according to claim 1, wherein
the cathode includes the first solid electrolyte material.
10. The battery according to claim 1, wherein
the electrolyte layer includes a third electrolyte layer;
the third electrolyte layer is disposed between the cathode and the first electrolyte layer; and
the cathode and the third electrolyte layer include a sulfide solid electrolyte.
11. A battery, comprising:
a cathode;
an anode; and
an electrolyte layer disposed between the cathode and the anode, wherein:
the electrolyte layer includes a first electrolyte layer and a second electrolyte layer,
the first electrolyte layer includes a first solid electrolyte material,
the second electrolyte layer includes a second solid electrolyte material which is a material different from the first solid electrolyte material,
the first solid electrolyte material includes:
lithium;
at least one selected from the group consisting of metalloid elements and metal elements other than lithium; and
at least one kind selected from the group consisting of chlorine, bromine, and iodine,
the first solid electrolyte material does not include sulfur, and
the first solid electrolyte material includes yttrium or iron.
12. The battery according to claim 11, wherein
the first solid electrolyte material is $Li_3YI_6$, $Li_3YCl_6$, $Li_{3.1}Y_{0.9}Ca_{0.1}Br_6$, or $Li_2FeCl_4$.
13. The battery according to claim 11, wherein
the first electrolyte layer is disposed between the cathode and the second electrolyte layer.
14. The battery according to claim 13, wherein
the first electrolyte layer is not in contact with the anode.
15. The battery according to claim 11, wherein
the second solid electrolyte material is a sulfide solid electrolyte.
16. The battery according to claim 15, wherein
the sulfide solid electrolyte includes lithium sulfide and phosphorus sulfide.
17. The battery according to claim 16, wherein
the sulfide solid electrolyte is $Li_2S$—$P_2S_5$.
18. The battery according to claim 11, wherein
the cathode includes the first solid electrolyte material.
19. The battery according to claim 11, wherein:
the electrolyte layer includes a third electrolyte layer,
the third electrolyte layer is disposed between the cathode and the first electrolyte layer, and
the cathode and the third electrolyte layer include a sulfide solid electrolyte.
20. A battery, comprising:
a cathode;
an anode; and
an electrolyte layer disposed between the cathode and the anode, wherein:
the electrolyte layer includes a first electrolyte layer and a second electrolyte layer,
the first electrolyte layer includes a first solid electrolyte material, the second electrolyte layer includes a second solid electrolyte material which is a material different from the first solid electrolyte material,
the first solid electrolyte material includes:
  lithium;
  at least one selected from the group consisting of metalloid elements and metal elements other than lithium; and
  at least one kind selected from the group consisting of chlorine, bromine, and iodine,
the first solid electrolyte material does not include sulfur,
the electrolyte layer includes a third electrolyte layer,
the third electrolyte layer is disposed between the cathode and the first electrolyte layer; and
the cathode and the third electrolyte layer include a sulfide solid electrolyte.

* * * * *